(12) United States Patent
Jin et al.

(10) Patent No.: US 8,284,637 B2
(45) Date of Patent: Oct. 9, 2012

(54) SHAPED PLASMON GENERATORS FOR THERMALLY-ASSISTED MAGNETIC RECORDING

(75) Inventors: Xuhui Jin, San Jose, CA (US); Kenichi Takano, Santa Clara, CA (US); Yuchen Zhou, San Jose, CA (US); Erhard Schreck, San Jose, CA (US); Joe Smyth, Aptos, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 274 days.

(21) Appl. No.: 12/657,637

(22) Filed: Jan. 25, 2010

(65) Prior Publication Data
US 2011/0181979 A1   Jul. 28, 2011

(51) Int. Cl.
*G11B 11/00* (2006.01)
(52) U.S. Cl. .................... 369/13.33; 369/13.13
(58) Field of Classification Search ............... 369/13.33, 369/13.13, 13.32, 13.02, 13.17, 112.09, 112.21, 369/112.24, 112.27; 360/59; 385/129, 31, 385/88–94; 29/603.01–603.27; 250/201.3, 250/201.5
See application file for complete search history.

(56) References Cited

U.S. PATENT DOCUMENTS

| | | | |
|---|---|---|---|
| 6,741,524 B2 | 5/2004 | Ichihara et al. | |
| 8,036,069 B1 * | 10/2011 | Jin et al. | 369/13.32 |
| 8,059,496 B1 * | 11/2011 | Zhou et al. | 369/13.33 |
| 2008/0192376 A1 | 8/2008 | Tanaka et al. | |
| 2008/0198496 A1 | 8/2008 | Shimazawa et al. | |
| 2010/0073802 A1 * | 3/2010 | Komura et al. | 369/13.33 |
| 2010/0079895 A1 * | 4/2010 | Takayama et al. | 369/13.33 |
| 2010/0103553 A1 * | 4/2010 | Shimazawa et al. | 369/13.33 |
| 2010/0118431 A1 * | 5/2010 | Tomikawa et al. | 369/13.33 |
| 2010/0202256 A1 * | 8/2010 | Ito et al. | 369/13.33 |
| 2010/0315735 A1 * | 12/2010 | Zhou et al. | 369/13.33 |
| 2011/0128827 A1 * | 6/2011 | Shimazawa et al. | 369/13.33 |
| 2011/0228653 A1 * | 9/2011 | Shimazawa et al. | 369/13.32 |

OTHER PUBLICATIONS

Co-Pending U.S. Appl. No. 12/456,290, filed Jun. 15, 2009, "Plasmon Antenna With Magnetic Core for Thermally Assisted Magnetic Recording," assigned to the same assignee as the present invention.

* cited by examiner

*Primary Examiner* — Tax X Dinh
(74) *Attorney, Agent, or Firm* — Saile Ackerman LLC; Stephen B. Ackerman (57) ABSTRACT

A TAMR (Thermal Assisted Magnetic Recording) write head uses the energy of optical-laser generated plasmons in a plasmon generator to locally heat a magnetic recording medium and reduce its coercivity and magnetic anisotropy. To enable the TAMR head to operate most effectively, the antenna is formed in three portions, a wide portion of uniform horizontal area, a tapered portion tapering towards the ABS of the write head and a narrow tip extending from the tapered portion to the ABS. The wide portion enhances coupling of optical radiation from a waveguide to surface plasmons generated within the generator, the tapered portion condenses and focuses the plasmons as they propagate towards the ABS and the narrow tip further focuses the surface plasmon field at the medium surface.

18 Claims, 12 Drawing Sheets

FIG. 10c ary dimensions of the complete magnetic circuit described in Fig. 1b are sufficient to generate the required write field.

SHAPED PLASMON GENERATORS FOR THERMALLY-ASSISTED MAGNETIC RECORDING

RELATED APPLICATION

This Application is related to Ser. No. 12/456,290 filed on Jun. 15, 2009 and assigned to the same assignee as the present application.

BACKGROUND OF THE INVENTION

1. Field of the Invention

This invention relates to the fabrication of magnetic read/write heads that employ TAMR (thermally assisted magnetic recording) to enable writing on magnetic media having high coercivity and high magnetic anisotropy. More particularly, it relates to the use of a plasmon antenna (PA) to transfer optically induced plasmon energy from the read/write head to the media.

2. Description of the Related Art

Magnetic recording at area data densities of between 1 and 10 Tera-bits per $in^2$ (Tbpsi) involves the development of new magnetic recording mediums, new magnetic recording heads and, most importantly, a new magnetic recording scheme that can delay the onset of the so-called "superparamagnetic" effect. This effect is the thermal instability of the extremely small magnetic regions on which information must be recorded in order to achieve the required data densities. A way of circumventing this thermal instability is to use magnetic recording mediums with high magnetic anisotropy and high coercivity that stabilize the recorded regions against thermal perturbations, yet can still be written upon by the magnetic fields of the increasingly small write heads required for producing the high data density. This way of addressing the problem produces two conflicting requirements:

1. the need for a stronger writing field that is necessitated by the highly anisotropic and coercive magnetic mediums and;
2. the need for a smaller write head of sufficient definition to produce the high areal write densities, which write heads, disadvantageously, produce a smaller field gradient and broader field profile.

Satisfying these requirements simultaneously may be a limiting factor in the further development of the present magnetic recording scheme used in state of the art hard-disk-drives (HDD). If that is the case, further increases in recording area density may not be achievable within those schemes. It should be noted that these conflicts are not restricted to the typical magnetic field writer configurations in which the write head is mounted within a slider that flies above the magnetic medium at distances of 0.5 nm or greater. Indeed, other methods for writing on a magnetic medium, such as the use of near-contact writers in which the head-to-disk clearance may be 0.5 nm or less, also fall victim to the fact that the small writers required for the high resolution writing do not produce sufficient field strengths to overcome the coercivity and anisotropy of the recording medium.

One way of addressing these conflicting requirements, wherever they arise, is by the use of assisted recording methodologies, notably thermally assisted magnetic recording, or TAMR.

The prior art forms of assisted-recording methodologies being applied to the elimination of the above problem share a common feature: transferring energy into the magnetic recording system through the use of physical methods that are not directly related to the magnetic field produced by the write head. If an assisted recording scheme can produce a medium-property profile to enable low-field writing localized at the write field area, then even a weak write field can produce high data density recording because of the multiplicative effect of the spatial gradients of both the medium property profile and the write field. These prior art assisted-recording methods either involve deep sub-micron localized heating by an optical beam or ultra-high frequency AC magnetic field generation.

The heating effect of TAMR works by raising the temperature of a small region of the magnetic medium to essentially its Curie temperature ($T_C$), at which temperature both its coercivity and anisotropy are significantly reduced and magnetic writing becomes easier to produce within that region.

Recently, a particular implementation of TAMR has appeared, namely the transfer of energy from electromagnetic radiation to a small, sub-micron sized region of a magnetic medium through interaction with the near field of an edge or surface plasmon. In this case the electromagnetic radiation is radiation in the range of optical frequencies and that optical frequency radiation is excited by an optical frequency laser. The plasmon is excited in a small conducting plasmon generator (PG) that is incorporated within the read/write head structure. The particular source of optical excitation can be a laser diode, also contained within the read/write head structure, or a laser source that is external to the read/write head structure, either of which directs its beam at the antenna through a means such as an optical waveguide (WG). As a result of the WG, the optical mode of the incident radiation couples to a plasmon mode in the PG, whereby the optical energy is converted into plasmon energy, This plasmon energy is then focused by the PG onto the medium at which point the heating occurs. When the heated spot on the medium is correctly aligned with the magnetic field produced by the write head pole, TAMR is achieved.

As we shall see, to both obtain and maintain efficient coupling between the optical radiation carried by the WG and the plasmon mode excited within the PG, it is necessary to: (1) engineer the shape of the PG so that it matches well with the size of the WG for the coupling itself to be efficient, and (2) to condense the plasmon energy into a highly confined plasmon mode by incorporating and utilizing a self-focusing portion within the PG.

K. Tanaka et al. (US Publ. Pat. App. US2008/0192376) and K. Shimazawa et al. (US Publ. Pat. App. US2008/0198496) both describe TAMR structures that utilize edge plasmon mode coupling.

Ichihara et al (U.S. Pat. No. 6,741,524) discloses an electron emitter having a sharp tapered shape.

Figure 1A:
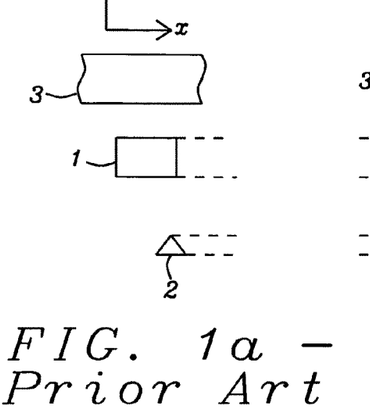
FIG. 1a, 1b and 1c are schematic drawings of a prior art TAMR design.
Figure 1B:
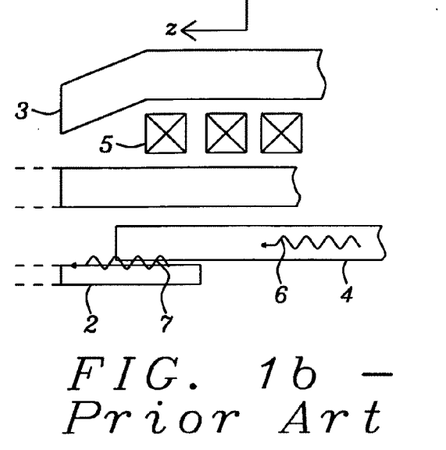

Referring first to FIG. 1a, there is shown a schematic illustration of an exemplary prior art TAMR structure in an air bearing surface (ABS) view and, in FIG. 1b, in a side cross-sectional view. The dimensional directions in the ABS view are indicated as x-y coordinates, with the x coordinate being a cross-track coordinate in the plane of the medium (ABS plane), the y coordinate being a down-track direction also in the plane of the medium and the z-direction being along the length of the magnetic pole, perpendicular to the ABS plane. As shown in both FIG. 1a and FIG. 1b, the conventional magnetic induction-type write head includes a main magnetic pole (MP) (1), which is shown with a rectangular ABS shape, a writer coil (5) (three winding cross-sections drawn) for inducing a magnetic field within the pole structure and a return pole (3) to complete the flux circuit. Generally, magnetic flux emerges from the main magnetic pole, passes through the magnetic media and returns through the return pole. As already mentioned above, nothing in this configuration should be considered as restricting the writer to any particular distance above the recording surface. The writer may be mounted in a slider that is configured to aerodynamically fly above the moving medium, or the slider may be a contact type slider that may be configured to virtually make contact with the recording medium. As long as the problem being addressed is one of enabling a small write field to overcome the coercivity and anisotropy of a magnetic medium, the following methodology will be applicable.

Figure 1C:
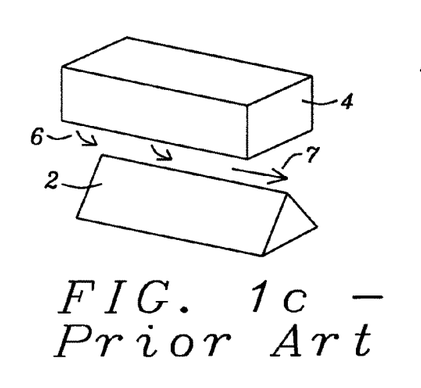

The waveguide (WG) (4) is an optical waveguide that guides optical frequency electromagnetic radiation (6) towards the ABS (10) of the write head. The ABS end of the write head will be denoted its distal end. The plasmon generator, PG (2) (note, we will refer to a device that propagates a plasmon as a "plasmon generator, PG", whereas a device that supports a local plasmon mode may be referred to as a "plasmon antenna PA"), which has a triangular shape in the ABS plane, extends distally to the ABS. The distal end of the waveguide (4) terminates at a distance, d, which ranges from 0 to a few microns, away from the ABS. An optical frequency mode (6) of the electromagnetic radiation couples to the edge plasmon mode (7) of the PG (2) and energy from the edge plasmon mode is then transmitted to the media surface where it heats the surface locally at the ABS edge of the PG triangle. The local confinement of the edge plasmon mode is determined by the angle and dimensions of the triangular cross-section of the PG. Thus the PG can be engineered to achieve a very small light spot as well as a high temperature gradient in the medium, both of which are desirable in the TAMR recording scheme. Due to the long body and large metal volume of the PG, heating damage introduced to the PG during the writing process can be greatly reduced compared to an isolated PG of smaller volume. Referring finally to perspective schematic FIG. 1c, there is shown the PG (2), the WG (4) slightly above the vertex edge of the PG, the optical frequency radiation (downward directed arrows (6)) impinging upon the PG and the edge plasmon mode (7), shown as a horizontal arrow, propagating along the vertex of the PG.

It is always desirable to consume less optical laser power and, therefore, to pursue high optical efficiency so as to use as little power as possible in HDD operation utilizing TAMR. The prior arts have some critical limitations imposed on their use of optical power. First, the efficiency of coupling the waveguide radiation (6) to the plasmon mode (7) is limited due to the mismatch between the diffraction-limited optical mode (6) in the waveguide (WG) and the sub-diffraction limited edge plasmon mode (7) within the plasmon generator portion of the PG (2). Because the WG mode is much larger than the highly confined plasmon mode (7), only a small portion of the optical power can be transferred. Second, the propagation loss of the edge plasmon mode along the plasmon generator (2) could be significant due to the high confinement of the plasmon mode. Third, the coupling and propagation efficiencies of the edge plasmon mode tends to be highly sensitive to the variations of the edge shape of the PG, so tight fabrication tolerances are necessary.

SUMMARY OF THE INVENTION

It is, therefore, a first object of the present invention to improve the optical efficiency of a TAMR system by utilizing a new shape of a plasmon generator, PG, structure to efficiently deliver the optical power to the spot being heated in the medium.

It is a second object of this invention to achieve the first object while remaining within fabrication processes and methods that are compatible with existing magnetic head fabrication processes.

It is a third object of this invention to apply the newly shaped plasmon generator to improve the operation of any write head configuration, regardless of the distance between it and the recording medium during disk drive operation.

These objects will be achieved by means of a shaped plasmon generator design in which there is not only improved matching between the size of the optical waveguide and the size of the generator to achieve more efficient mode coupling, but there is also a mechanism by which the surface plasmon energy can be condensed into a highly confined plasmon mode by means of a self-focusing portion designed into the shape of the plasmon generator.

Figure 2A:
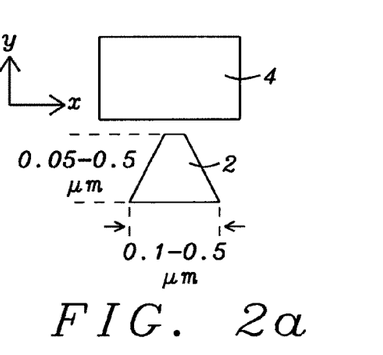
FIGS. 2a, 2b and 2c are schematic illustrations of an embodiment of the present invention.
Figure 2B:
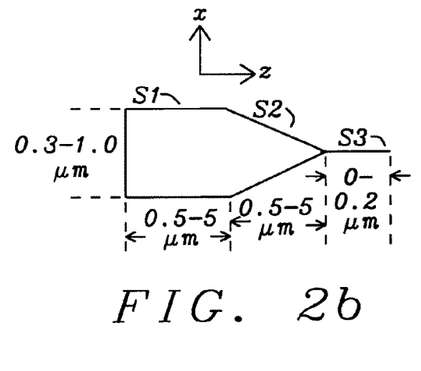
Figure 2C:
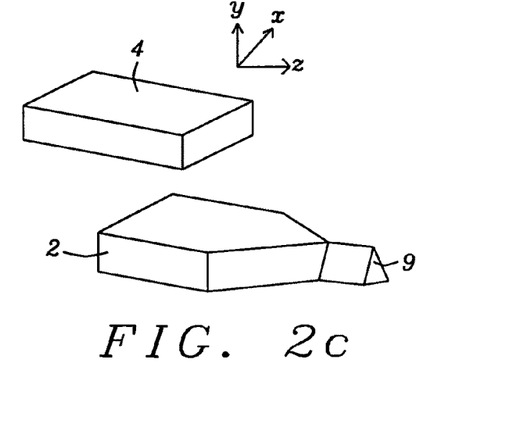
Figure 3A:
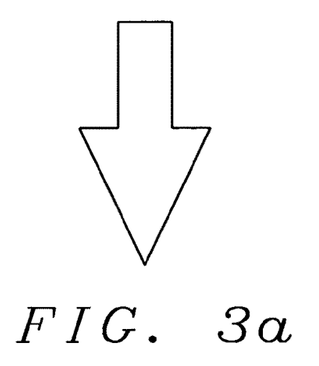
FIGS. 3a-3f are a set of schematic illustrations showing six possible horizontal/lateral cross-sectional shapes (in the x-z plane) of the plasmon generator of the present invention.
Figure 3B:
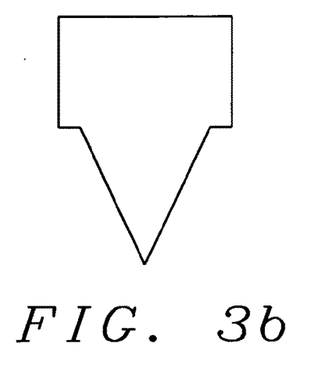
Figure 3C:
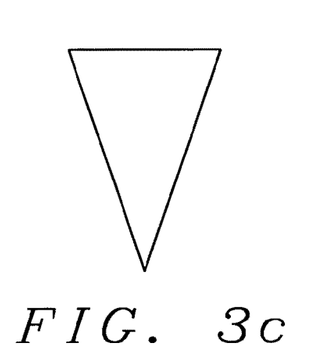
Figure 3D:
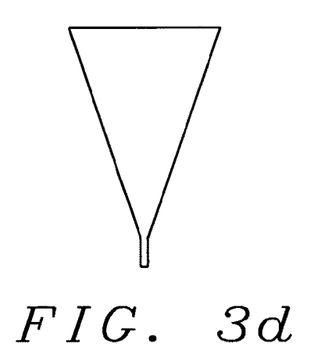
Figure 3E:
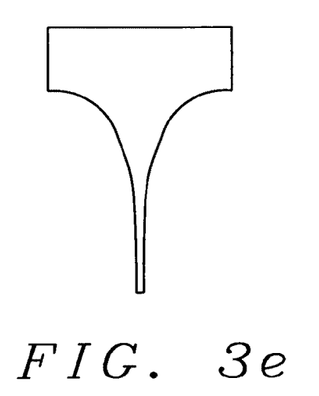
Figure 3F:
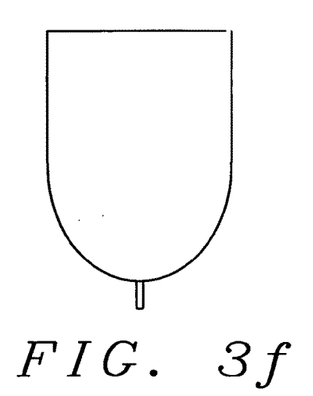
Figure 4A:
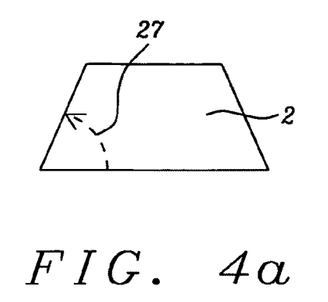
FIG. 4a-4d are schematic illustrations showing four possible horizontal cross-sectional shapes (in the x-y plane) of the back end of the plasmon generator of the present invention.
Figure 4B:
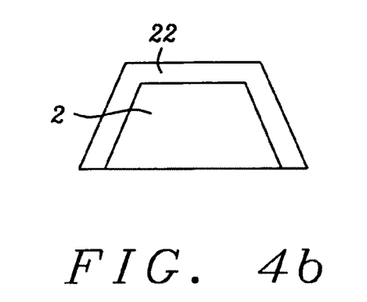
Figure 4C:
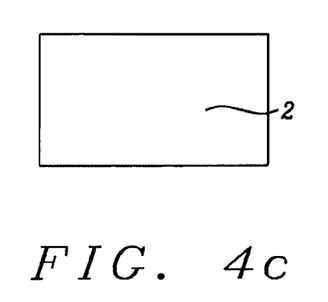
Figure 4D:
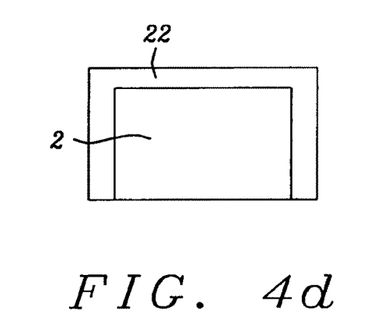
Figure 5A:
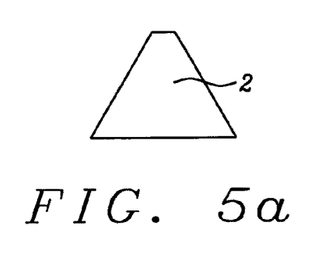
FIG. 5a-5d is a schematic illustration showing four possible horizontal cross-sectional shapes (in the x-y plane) of the ABS end of the plasmon generator of the present invention
Figure 5B:
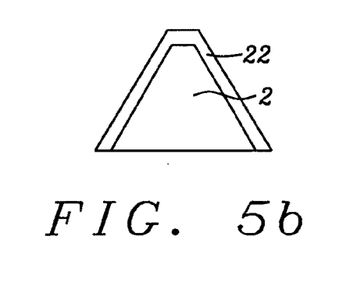
Figure 5C:
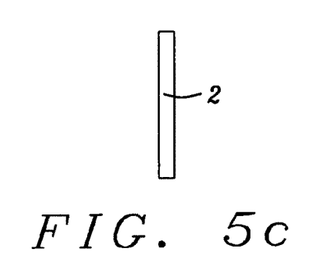
Figure 5D:
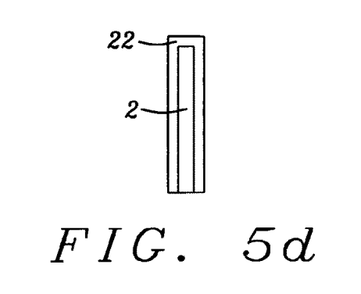

Referring next to each of FIGS. 2a, 2b and 2c, there is shown schematically the structure that will achieve the objects of the invention. As shown in the ABS view of FIG. 2a, an optical waveguide (4) is positioned above the plasmon generator, PG (2). The ABS shape of the PG has a slightly truncated triangular cross-section. The dimensions of the ABS cross-section are a base width between approximately 0.1 and 0.5 microns and a height of between approximately 0.05 and 0.5 microns.

Referring next to a schematic overhead view in FIG. 2b (showing the uppermost surface), there can be seen that the shape of the PG (2) is divided into three sectors. The first sector, S1, is of uniform width (in the x-direction) between approximately 0.3-1.0 microns and a length (in the z-direction) of between approximately 0.5-5.0 microns. It is this sector that couples the waveguide (WG) radiation into a surface plasmon (SP) propagating along the interface between the PG and the cladding layer of the WG. The second, tapered, sector, S2, is of triangular shape and length between approximately 0.5 and 5.0 microns. It is this sector that condenses the surface plasmon in the lateral direction (z-direction) as it propagates towards the ABS. The third sector, is a straight or tapered portion, S3, of length between approximately 0 and 0.2 microns, which further delivers the energy in the highly condensed and confined surface plasmon mode to the medium placed beneath the PG.

As can be more clearly seen in the isometric view of the PG (2) shown in schematic FIG. 2c, the ABS surface (9) of the PG can assume a trapezoidal, triangular or rectangular shape, with the slightly truncated triangular shape being shown here (see also FIG. 2a). Compared to PG shapes described in the prior art, that have uniform cross-sectional shapes along the z-direction, the present PG structure can have a greater optical efficiency due to the following reasons: 1) a larger overlapping area between the WG mode and the SP mode resulting from the S1 section; 2) adiabatic focusing (i.e., increasing confinement and localization during propagation) and condensing of the SP by the tapered S2 section; and 3) the lower propagation loss of a less confined SP.

Referring now to schematic FIGS. 3a-3f, there are shown a succession of possible horizontal/lateral (x-z plane) cross-sectional shapes that would be suitable for the PG of the invention. Any of these shapes could replace the shape shown in FIG. 2b.

Referring to schematic FIG. 4a-4d, there are shown a succession of four PG cross-sectional shapes in the x-y plane (hereinafter referred to as the horizontal plane) of the back end (end of S1 farthest opposite the ABS) of the PG, which is the end at which WG radiation enters the PG. Two of the shapes (a) and (b) are trapezoidal, with (a) being a solid PG (2) formed of Ag or Au or other conducting material suitable for the generation of plasmons and (b) being a conducting layer of Ag or Au or other plasmon generating material (22) formed over a core (2) of magnetic material or dielectric material. The trapezoid is characterized by a flare angle (27) between base and side of between approximately 45 and 90 degrees, but that can be adjusted for optimal performance. Shapes (c) and (d) are rectangular in cross-section and (c) is a solid PG (2) formed of Ag or Au or other plasmon generating material while (d) is a layer (22) of such material formed over a core (2) of dielectric or magnetic material. The horizontal cross section of S1 will typically be uniform, meaning that it will not change in the direction towards the ABS.

Referring now to schematic FIG. 5a-5d, there are shown a succession of four PG cross-sectional (in the x-y plane) shapes corresponding to the cross-sectional shape at the ABS of the PG. The ABS could be the distal end of section S3, if the PG has such a third section, or it could be the distal end of S2 if there is no final projecting section S3. Two of the shapes (a) and (b) are trapezoidal, with sufficient flare angle (approximately 60 degrees) that they may be called truncated triangles. Shape (a) is that of a solid PG (2) formed of Ag or Au or other conducting material suitable for the generation of plasmons and shape (b) is a conducting layer (22) of Ag or Au or other plasmon generating material formed over a core (2) of magnetic material or dielectric material. Shapes (c) and (d) are very narrow rectangles in cross-section and (c) is a solid PG (2) formed of Ag or Au or other plasmon generating material while (d) is a layer (22) of such material formed over a cor2 (2) of dielectric or magnetic material. Referring back to FIG. 2b, it can be seen that section S2 tapers in its x dimension along the z-direction towards the ABS. The nature of the taper is such that there is a smooth variation in the horizontal cross-section of S2 between the cross-section of S1 and the cross-section of S3, if there is an S3 portion.

All proposed PG structures can be made of highly electrically conductive metals, such as aluminum, gold, silver, copper or their alloys, depending on the choice of the radiation wavelength and the dielectric constant of the waveguide materials. A general guideline is to choose a metal that supports a surface plasmon of relatively long propagating length, e.g., one to tens of microns. Each section of the PG structure can be readily designed to achieve the best optical efficiency. For example, the lateral dimension along the x-direction of the S1 section can be designed to match the size of the WG mode. The tapered angle and lateral dimension along the x-direction of the S3 section (tip width) and the distance along the z-direction of the S2 section can be designed to allow the "adiabatic focusing" of the surface plasmon (the process by which the surface plasmon is compressed and localized as it moves down the S2 section) and to minimize propagation loss of energy in the surface plasmon as it travels along the z-direction. The existence of the S3 section can provide better ABS lapping tolerance.

Figure 6A:
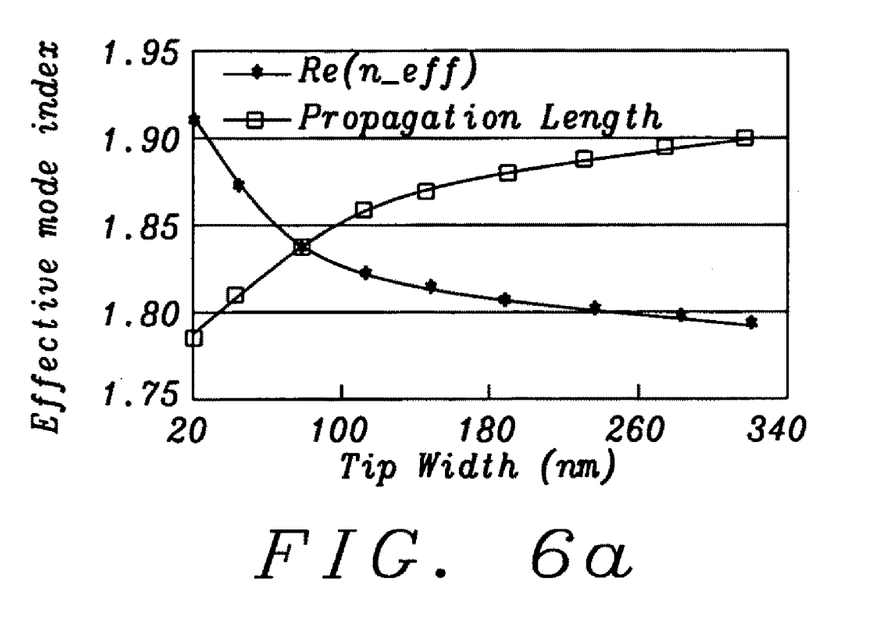
FIG. 6a-6c are schematic (graphical and pictorial) modeling results showing the role of plasmon generator tip width on mode generation of a surface plasmon mode.

The SP mode that is supported by different PG cross-sections (x-y plane cross-sections taken along the z-direction) is a function of the tip width and the flare angle of the PG side wall in the x-y plane. Referring to FIG. 6a, there is shown a graphical representation of physical parameters of the calculated surface plasmon mode for a 60° trapezoidal shape Au surrounded by alumina at the wavelength of 900 nm. The curve defined by X points is the real part of the effective index of the mode. The curve defined by solid squares is the propagation length of the plasmon mode. The x-axis is the tip width of the ABS surface of the generator. It can be seen from the graph that that the wider tip produces a smaller effective mode index, implying less plasmon confinement at the tip. On the other hand, for the wider tip the plasmon has a greater propagation length. Therefore, reducing the tip width will compress and confine the plasmon mode to a greater extent.

Figure 6B:
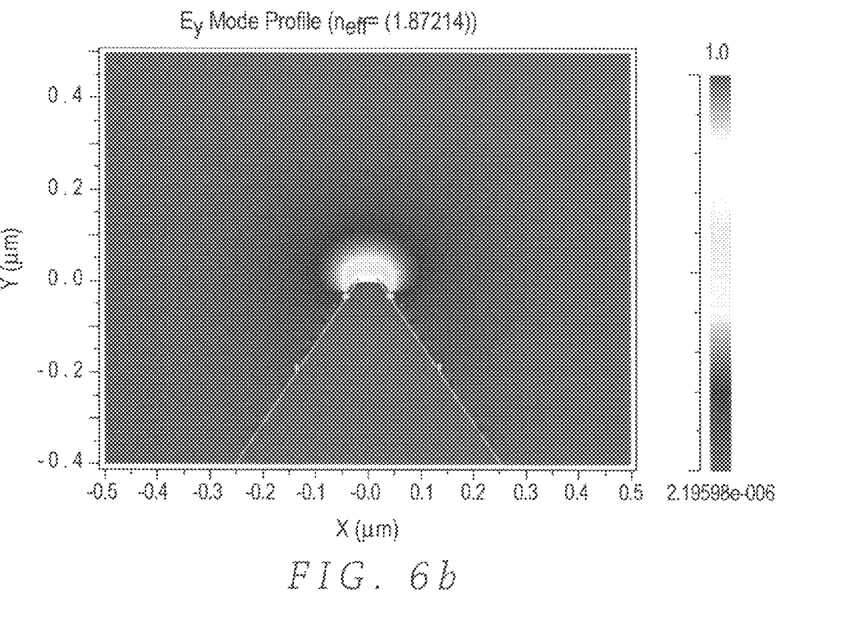
Figure 6C:
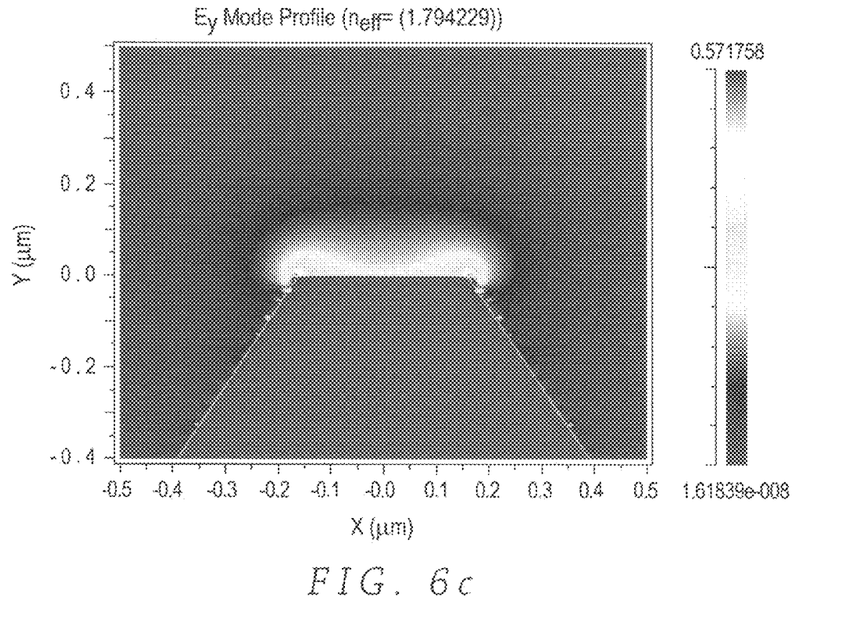

FIGS. 6b and 6c are (grey scale) pictorial modeling results (correlating with the graphical representation of FIG. 6a) that show the surface plasmon mode distribution for a trapezoid with a 40 nm tip width (FIG. 6b) and a trapezoid with a 320 nm tip width (FIG. 6c) respectively. Note that the degree of confinement of a plasmon mode is proportional to its wavelength in the generator, $\lambda_{sp}$, which, in turn, is proportional to $\lambda_0/n_{eff}$, where $\lambda_0$ is the wavelength in vacuum and $n_{eff}$ is the effective mode index of the surface plasmon. Thus, a large mode index means that the surface plasmon is more narrowly confined laterally. The E-field of the surface plasmon is maximized at the interface between the metal core of the plasmon generator and the surrounding dielectric medium and it decays exponentially away from the interface.

It can be seen that the wider tip has a smaller effective mode index ($n_{eff}$=1.79 for the wide tip vs. 1.87 for the narrower tip), therefore less surface plasmon mode confinement to the tip, but a longer propagation length. So when a taper is constructed with a gradually reduced tip width, the surface plasmon mode energy will be more condensed and confined.

Figure 7A:
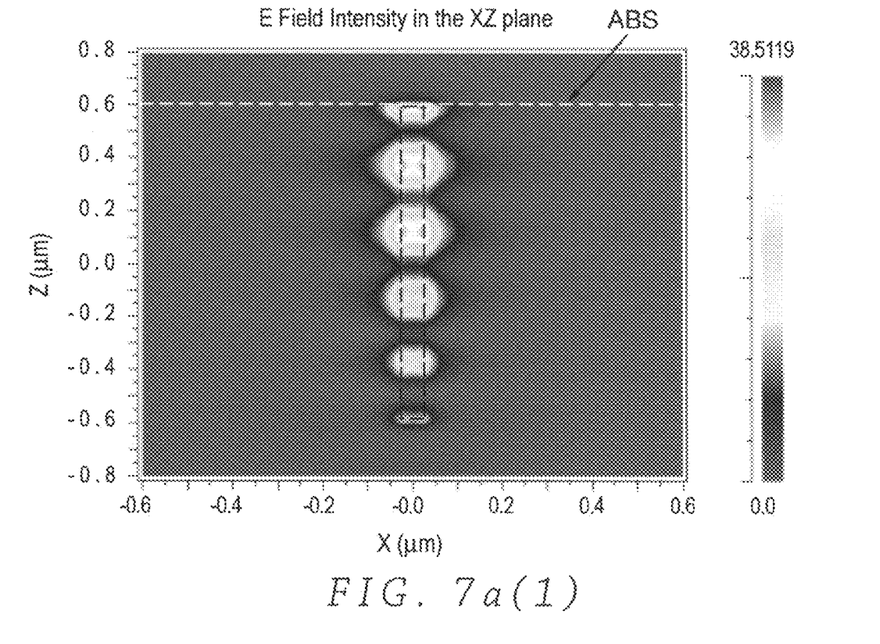
FIG. 7a-7c each display three representations (1, 2, 3) of the results of modeling to show the E-field intensity of various surface plasmon modes as functions of position along plasmon generators of different cross-sectional shapes.
Figure 7B:
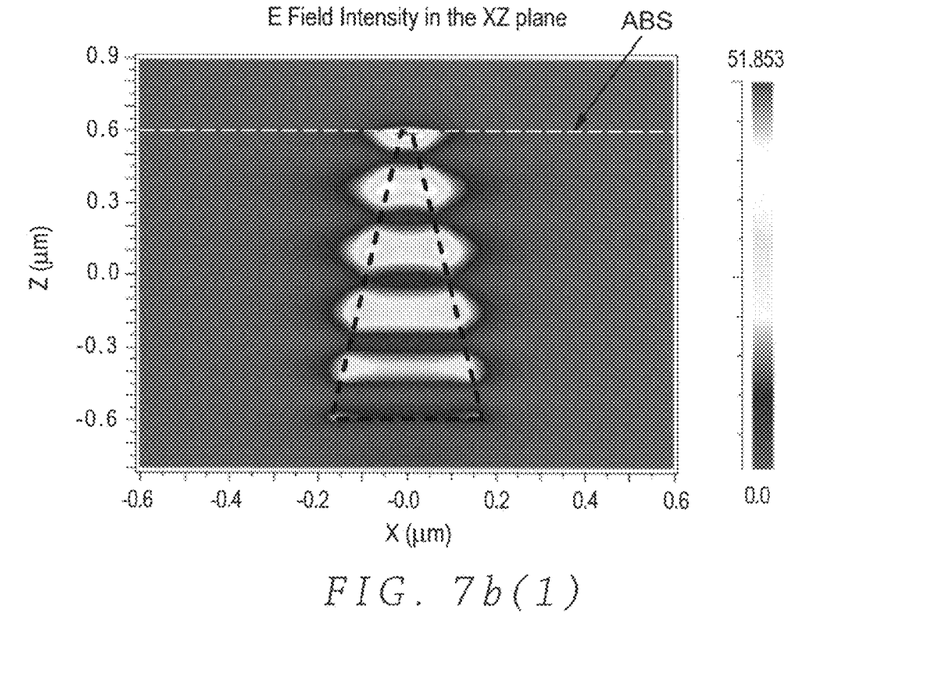
Figure 7C:
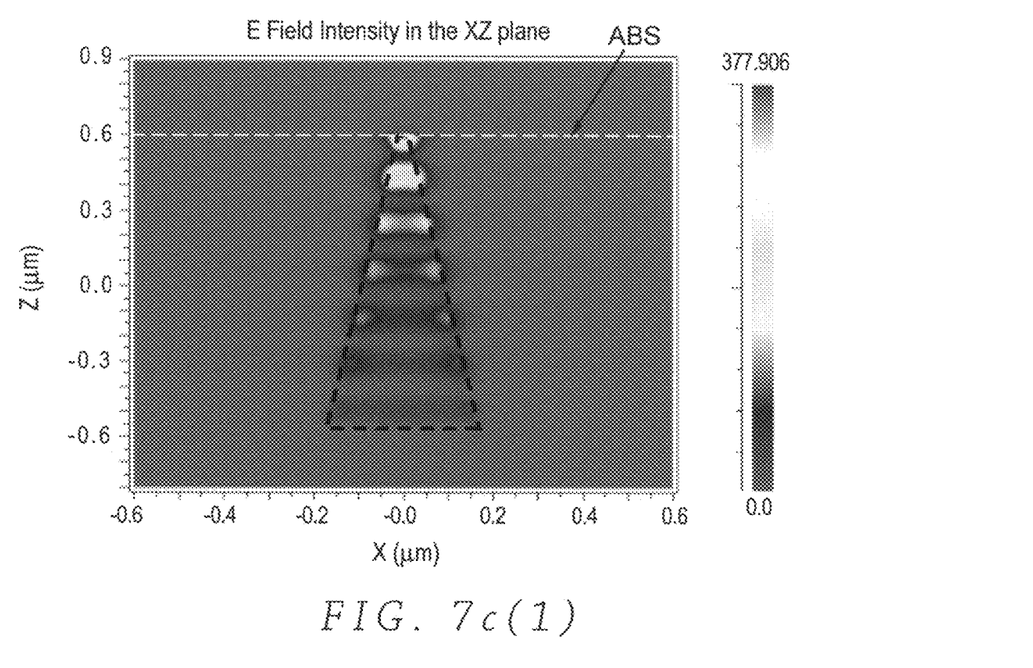

To demonstrate the improvement of optical efficiency (transference of optical energy from the WG to the PG) using the PG designs of this invention, finite-difference time domain (FDTD) analysis was employed to model the effects of full-wave electromagnetic simulation of the coupling of WG optical radiation with the SP wave that is propagating along the PG structure. The simulation model includes the optical waveguide, the plasmon generator, the cladding material surrounding both the WG and PG and the air space terminating the ABS surface. Three PG designs were evaluated: FIG. 7a (1-3) shows the effects of a shaped plasmon generator with a uniform trapezoidal cross-section in the z-direction; FIG. 7b (1-3) shows the effect of a shaped plasmon generator with a gradually shrinking rectangular cross-section in the z-direction and FIG. 7c (1-3) shows the effect of a plasmon generator with a gradually shrinking triangular cross-section in the z-direction. In each of FIGS. 7a, 7b and 7c, there are three separate gray scale illustrations, numbered 1, 2 and 3 respectively. Illustration 1 shows the E-field intensity of the plasmon as a function of x as it propagates in z towards the ABS. Illustration 2 shows the E-field intensity in the y-z plane as the surface plasmon propagates towards the ABS. The distal end of the WG and the side of the PG are indicated schematically in dashed-line outline. Finally, illustration 3 shows the E-field intensity in the x-y plane across an exemplary x-y cross-section at 20 nm from the ABS. For simplicity, the S1 and S3 sections were omitted from the shape of the generator.

Analysis of the simulation results for the gradually shrinking triangular and trapezoidal cross-sections indicates that the plasmon field intensity is greatly enhanced at the ABS of the PG as compared with a non-varying cross-section. For example (FIG. 7b, illustration 3), at a distance of 20 nm from its ABS, the trapezoidally shaped, shrinking cross-sectional PG generates a 47% improvement of peak field intensity over the non-shrinking PG (FIG. 7a) and the triangular shaped shrinking cross-sectional PG also shows an improvement over the non-shrinking cross-section. The improved field intensity also implies that a much smaller spot size will be produced on the medium surface. Generally, the modeling results demonstrate the substantial improvement of the shaped PG over prior art PGs in terms of peak field intensity and optical near-field confinement. It also shows that the tapered structure condenses the SP energy, which enhances the optical near-field as a consequence. Optimization of the matching waveguide, including the S1 section that overlaps with the waveguide, together with tuning the taper angle and the length of the S2 section and tuning the flare angle of the trapezoidal or triangular cross-section, should be able to improve the overall efficiency of optical energy delivery from the optical laser source to the spot being heated in the medium.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein.

DESCRIPTION OF THE PREFERRED EMBODIMENTS

The preferred embodiments of this invention are TAMR write heads for producing high density recording on a magnetic medium. The write head, which can be a flying type or a contact type, incorporates a plasmon generator (PG) (also denoted a plasmon antenna) of novel shape and structure that is attached to the write head so that a face of the PG emerges at the ABS of the writer at a position adjacent to the ABS of the main magnetic pole. The PG is radiatively coupled to optical frequency electromagnetic radiation generated preferably by an optical laser and guided by an optical waveguide (WG) to the PG. The radiative coupling generates surface plasmon modes within the antenna whose associated electromagnetic fields (the near fields) impinge on a small surface area of the magnetic recording medium, generating thermal energy within that area and causing the temperature of that area to increase. The magnetic pole of the writer produces a magnetic writing field that changes the local magnetization of the medium by switching magnetic grains within the heated spot. The shape of the PG includes a region of horizontal cross-section that is tapered in the direction of the ABS. This section and an additional tip section that extends to the ABS of the PG, may also be flared (tapered in vertical cross-section) with a flare angle that can be adjusted to optimize the plasmon energy transfer to the magnetic medium.

Figure 8A:
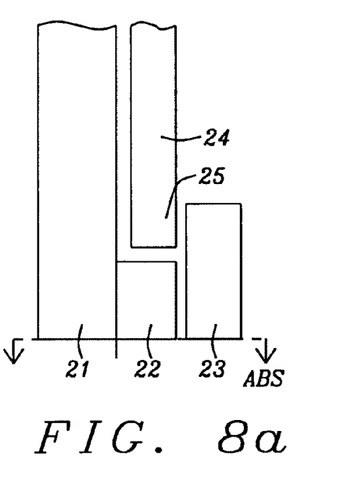
FIG. 8a-8c are schematic illustrations of a first embodiment of the present invention showing a configuration of the antenna/waveguide/write pole and a method for its fabrication.

Referring to FIG. 8a, there is shown a schematic illustration of a side view of a first embodiment of the invention showing the magnetic write pole (21), the plasmon generator (23), the adjacent optical waveguide (24) and a small stitched pole portion (22) that serves to support and mount the antenna and to assist in sending the magnetic write field to its proper location on the magnetic medium (not shown). The waveguide terminates behind the stitched pole.

The plasmon generator (23) transmits a plasmon mode towards the medium, which would be immediately beneath the ABS surface but is not shown here, and produces localized heating within the medium by the absorption of energy from the plasmon electric field. This heating reduces magnetic coercivity and anisotropy of the medium to enable an easier switching of its magnetization. Once the medium returns to ambient temperature, its coercivity and anisotropy maintains the magnetization of the previously heated region in a thermally stable mode.

The waveguide (24) transmits an optical mode of electromagnetic radiation that is generated by a radiation source such as a solid state optical laser (not shown). The radiation from the waveguide mode couples with the plasmon mode of the generator within the overlap region (25) between the waveguide and the generator.

Figure 8B:
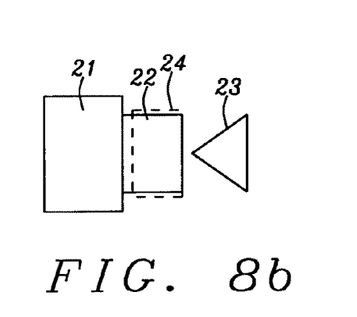

As shown in the ABS view of FIG. 8b, the plasmon generator in this embodiment has a triangular cross-sectional shape at its ABS end. The vertex (26) of the plasmon generator (23) points towards the waveguide and the magnetic write pole (21). The write pole (21), stitched pole (22) and plasmon generator (23) are fully exposed at the ABS of the TAMR head. The outline of the waveguide is in broken lines (24) to indicate that it is recessed behind the stitched pole (22). In this embodiment there is also a certain spacing (27) between the plasmon generator and the waveguide and stitched pole.

The dimensions of the ABS cross-section are a base width between approximately 0.1 and 0.5 microns and a height from base to vertex of between approximately 0.05 and 0.5 microns.

Referring again to FIG. 2b, the shape of the PG (23) shown in FIG. 8a is divided into three sectors. The first sector (farthest from the ABS), S1, is of uniform width (in the x-direction) between approximately 0.3-1.0 microns and a length (in the z-direction) of between approximately 0.5-5.0 microns. It is this sector that couples the waveguide (WG) radiation into a surface plasmon (SP) propagating along the interface between the PG and the cladding layer of the WG. The second, tapered, sector, S2, is of triangular shape and length between approximately 0.5 and 5.0 microns. It is this sector that condenses the surface plasmon in the lateral direction (z-direction) as it propagates towards the ABS. The third sector, is a straight or tapered portion, S3, of length between approximately 0 and 0.2 microns, which further delivers the energy in the highly condensed and confined surface plasmon mode to the medium placed beneath the PG.

Figure 8C:
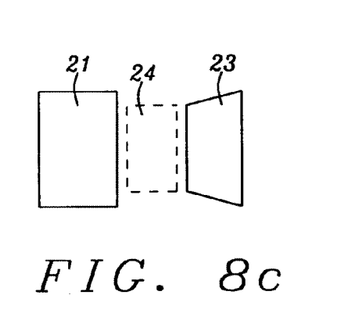

Referring finally to FIG. 8c, there is shown a view of FIG. 8a from the end opposite the ABS, showing the entrance end shape of the plasmon generator (23), the cross-sectional shape of the waveguide (24) and magnetic pole (21). Although the ABS shape of the plasmon generator in FIG. 7b is shown as triangular, the various shapes in FIG. 5 are all possible. The same is true for the back-end shape in FIG. 8c, where the other shapes of FIG. 4 are equally possible.

Figure 9A:
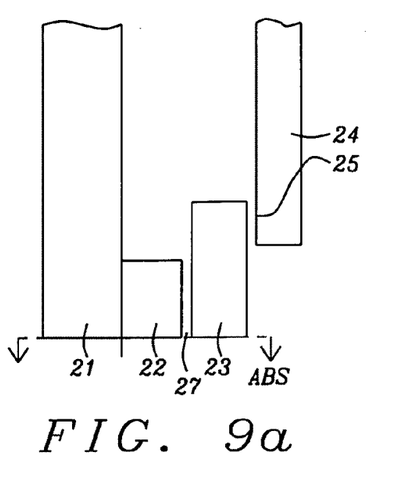
FIG. 9a-9c, are schematic illustrations of a second embodiment of the present invention showing a configuration of the antenna/waveguide/write pole.

Referring next to FIG. 9a, there is shown a schematic illustration of a side view of a second embodiment of the invention. In this embodiment the dimensions of the PG are the same as in the embodiment of FIG. 8a-8c and will not be re-iterated, but the positioning of the PG and WG are different. FIG. 9a shows the magnetic write pole (21), the PG (23), and a small stitched pole portion (22) that serves to support and mount the antenna and to assist in sending the magnetic write field to its proper location on the magnetic medium (not shown). The adjacent optical waveguide (24), in this embodiment, is located adjacent to the opposite side of the plasmon generator, so the plasmon generator is between the waveguide and the write pole (21) and stitched pole (22). The distal end of the waveguide is still recessed relative to the ABS of the configuration and terminates behind the stitched pole.

Figure 9B:
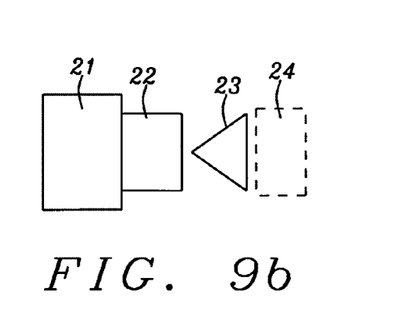

As shown in the ABS view of FIG. 9b, the vertex (26) of the PG (23) points towards the magnetic write pole (21). The write pole (21), stitched pole (22) and plasmon generator (23) are fully exposed at the ABS of the TAMR head. The outline of the waveguide is in broken lines (24) to indicate that it is recessed behind the stitched pole (22) in this illustration, but it may equally well extend to the ABS. In this embodiment there is also a certain spacing (27) between the plasmon generator and the waveguide and stitched pole.

Figure 9C:
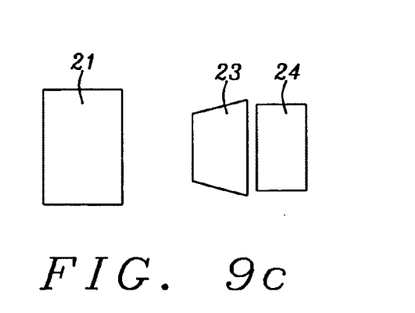

Referring finally to FIG. 9c, there is shown a view of FIG. 9a from the end opposite the ABS, showing the entrance end shape of the plasmon generator (23), the cross-sectional shape of the waveguide (24) at the opposite side of the plasmon generator and the magnetic pole (21). Although the ABS shape of the plasmon generator in FIG. 8b is shown as triangular, the various shapes in FIG. 5 are all possible. The same is true for the back-end shape in FIG. 9c, where the other shapes of FIG. 4 are equally possible.

Figure 10A:
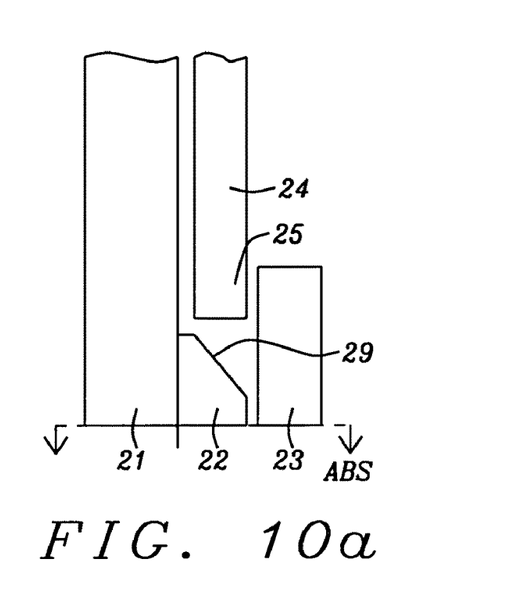
FIG. 10a-10c, are schematic illustrations of a third embodiment of the present invention showing a configuration of the antenna/waveguide/write pole.
Figure 10B:
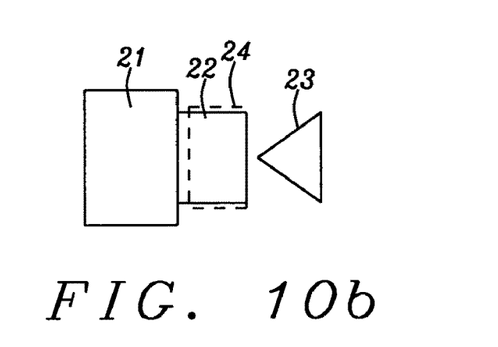
Figure 10C:
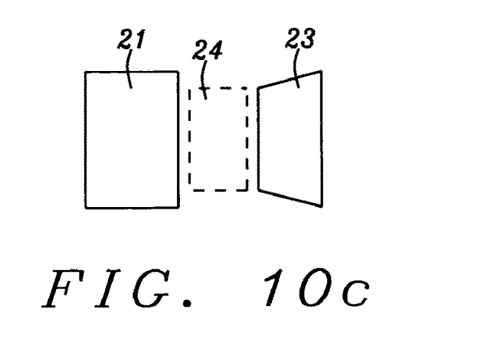

Referring to FIGS. 10a, 10b and 10c there are shown schematic illustrations of a side view, an ABS view and a back end view of a third embodiment of the invention that is in all its dimensions the same as the first embodiment, except that the stitched pole portion (22) has a tapered portion (29) at the end opposite its ABS end. This tapered portion allows a better propagation efficiency of the surface plasmon at the surface of the plasmon generator (23) as it propagates towards the ABS of the plasmon generator.

As shown in the ABS view of FIG. 10b, the vertex (26) of the plasmon generator (23) points towards the waveguide and the magnetic write pole (21). The write pole (21), stitched pole (22) and plasmon generator (23) are fully exposed at the ABS of the TAMR head. The outline of the waveguide is in broken lines (24) to indicate that it is recessed behind the stitched pole (22). In this embodiment there is also a certain spacing (27) between the plasmon generator and the waveguide and stitched pole.

Referring finally to FIG. 10c, there is shown a view of FIG. 8a from the end opposite the ABS, showing the entrance end shape of the plasmon generator (23), the cross-sectional shape of the waveguide (24) and magnetic pole (21). Although the ABS shape of the plasmon generator in FIG. 10b is shown as triangular, the various shapes in FIG. 5 are all possible. The same is true for the back-end shape in FIG. 10c, where the other shapes of FIG. 4 are equally possible.

As is understood by a person skilled in the art, the preferred embodiments of the present invention are illustrative of the present invention rather than being limiting of the present invention. Revisions and modifications may be made to methods, processes, materials, structures, and dimensions through which is formed and used a TAMR write head with a non-uniformly shaped plasmon antenna that condenses plasmon energy as it propagates towards an ABS, while still providing such a TAMR write head, formed and used in accord with the present invention as defined by the appended claims.

What is claimed is:

1. A TAMR head comprising:
   amagnetic write pole which, when energized, produces a magnetic field for writing on a magnetic recording medium;
   a stitched pole portion affixed to said write pole;
   a source of electromagnetic radiation;
   a waveguide for directing said electromagnetic radiation to an adjacent plasmon generator, wherein said electromagnetic radiation couples to a plasmon mode generated within said plasmon generator at a region of overlap between said waveguide and said plasmon generator;
   the plasmon generator for generating, propagating and condensing said plasmon mode as it propagates towards an ABS end of said plasmon generator and for transferring energy generated by said plasmon mode to a localized region of said magnetic recording medium, thereby heating said localized region and reducing its magnetic coercivity and anisotropy sufficiently for being written upon by said magnetic field; and wherein
   said plasmon generator is characterized by a non-uniform shape that includes a first portion of uniform horizontal cross-sectional area wherein said electromagnetic radiation from said adjacent waveguide is effective coupled to a plasmon mode, a second portion emerging from said portion of uniform horizontal cross-sectional area wherein the horizontal cross-sectional area of said second portion shrinks in area and change in shape in a direction towards said ABS end and within which said second portion said plasmon mode is condensed and focused as it propagates towards said ABS and a third potion of uniform cross-sectional shape emerging from said second portion wherein said third portion terminates at said ABS plane and effectively delivers said electromagnetic radiation from said surface plasmon mode to said magnetic recording medium.

2. The TAMR head of claim 1 wherein said plasmon generator comprises three sections, a first section, S1, of substantially uniform cross-section in a horizontal plane parallel to an ABS plane, a second section, S2, joined with S1 and extending from S1 in a direction towards said ABS and tapered in a direction towards said ABS, wherein said section S2 has a cross-section in said horizontal plane that diminishes in said tapering direction and a third section, S3, which is joined to said second section S2 and projects from said second section S2 in a direction towards said ABS, wherein said third section S3 has a horizontal cross-section that differs in shape from that of S2 and that is uniform or shrinks in size in a direction towards said ABS plane and wherein said S3 terminates at said ABS plane.

3. The TAMR head of claim 2 wherein said plasmon mode is compressed without energy loss as it propagates along said section S2.

4. The TAMR head of claim 2 wherein said plasmon mode transfers electromagnetic energy to said recording medium at said ABS end of said section S3.

5. The TAMR head of claim 2 wherein S1, in a horizontal plane, has a rectangular cross-section of uniform width between approximately 0.3-1.0 microns, of uniform height between approximately 0.02 and 0.5 microns and has a length in the direction towards the ABS of between approximately 0-3.0 microns.

6. The TAMR head of claim 2 wherein S1, in a horizontal plane, has a uniform trapezoidal cross-section of maximum width between approximately 0.3-1.0 microns, having a flare angle between approximately 45 and 90 degrees and is of uniform height between approximately 0.02 and 0.5 microns and has a length in the direction towards the ABS of between approximately 0.5-5.0 microns.

7. The TAMR head of claim 2 wherein S2 has a length in a direction towards the ABS between approximately 0.5 and 5.0 microns.

8. The TAMR head of claim 2 wherein S2 has a horizontal width that tapers in a direction towards the ABS and has a horizontal cross-section that is congruent with the horizontal cross-section of section S1 where sections S1 and S2 join.

9. The TAMR head of claim 2 wherein said third sector S3, is a uniformly wide or a tapered portion, having a cross-sectional shape that is congruent to the cross-sectional shape of said second section S2 at the position at which section S3 joins with section S2 and wherein section S3 is of length between approximately 0 and 0.2 microns.

10. The TAMR head of claim 9 wherein said section S3 delivers the energy in the highly condensed and confined plasmon mode to the medium placed beneath the PG.

11. The TAMR head of claim 1 wherein said plasmon generator is fabricated as a solid core of magnetic material, non-magnetic material or dielectric material over which solid core is formed a plasmon generating layer of conducting material.

12. The TAMR head of claim 2 wherein said plasmon generator is fabricated as a solid core of magnetic material, non-magnetic material or dielectric material over which solid core is formed a plasmon generating layer of conducting material.

13. The TAMR head of claim 12 wherein said magnetic material is FeCo, NiFe or Fe, Co, or B singly or in composites, wherein said dielectric material is alumina or $SiO_2$ and wherein said conducting material is Au, Cu, Al or Ag.

14. The TAMR head of claim 2 wherein said optical waveguide is above said stitched pole and aligned along said magnetic write pole and wherein said optical waveguide is between said plasmon generator and said magnetic write pole and wherein a vertex of said plasmon generator is immediately adjacent to said optical waveguide.

15. The TAMR head of claim 2 wherein said plasmon generator is between said optical waveguide and said magnetic write pole and wherein a vertex of said plasmon generator is adjacent to said magnetic write pole and wherein a side of said optical generator opposite said vertex is immediately adjacent to said optical waveguide.

16. The TAMR head of claim 2 wherein said optical waveguide is above said stitched pole and aligned along said magnetic write pole and wherein said optical waveguide is between said plasmon generator and said magnetic write pole and wherein a vertex of said plasmon generator is immediately adjacent to said optical waveguide and wherein a surface of said stitched pole opposite to a surface whereby said stitched pole is affixed to said write pole, tapers towards said write pole, thereby forming an increasing space between said plasmon generator and said stitched pole whereby the propagation of said plasmon mode is rendered more efficient.

17. The TAMR head of claim 1 wherein said magnetic pole is part of a read/write head encapsulated within a slider that flies aerodynamically above a rotating recording medium at a flying height between approximately 0.5 nm and 3.0 nm.

18. The TAMR head of claim 1 wherein said magnetic pole is part of a read/write head encapsulated within a slider that is substantially in a position of contact or near contact with a rotating recording medium, wherein said position of near contact is less than approximately 0.5 nm.

* * * * *